Aug. 4, 1942.                J. T. KEMPER                2,291,903
                              CABLE CLAMP
                           Filed Feb. 15, 1941
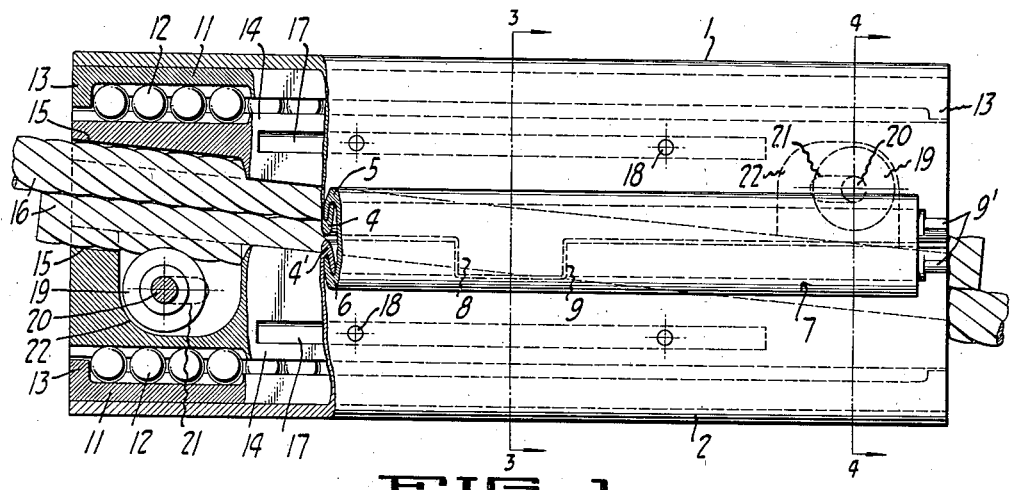
FIG_1_
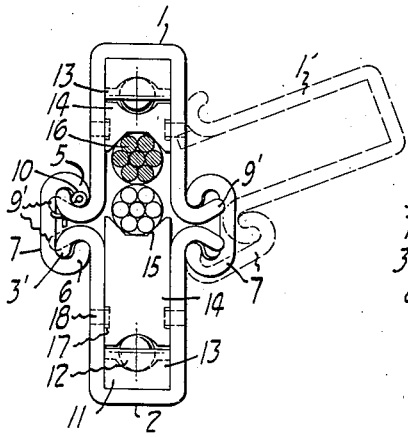   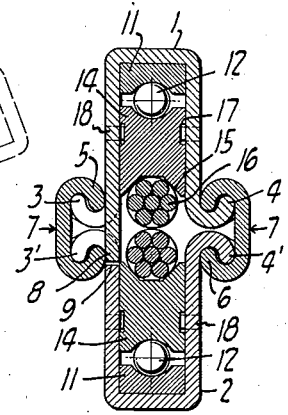   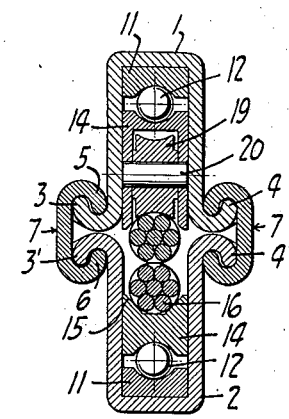
FIG_2_      FIG_3_      FIG_4_
FIG_5_
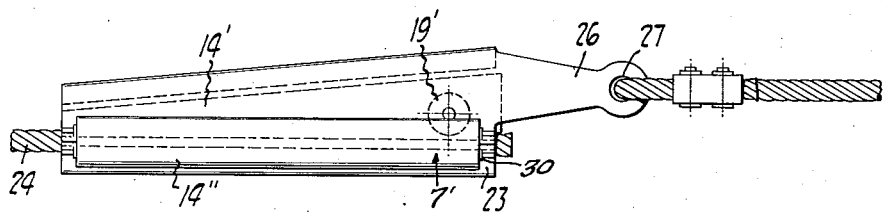
INVENTOR
John T. Kemper
BY Boyken & Mohler
ATTORNEYS Patented Aug. 4, 1942

2,291,903

UNITED STATES PATENT OFFICE 2,291,903

CABLE CLAMP

John T. Kemper, Hayward, Calif.

Application February 15, 1941, Serial No. 379,082

3 Claims. (Cl. 24—136)

This invention relates to cable clamps of the type shown in United States Letters Patent 1,811,942, June 30, 1931 and 1,924,438, August 29, 1933, the former being a clamp for a pair of cables to be clamped together and the latter being a strain clamp for a single cable, but both being of the type having the body of the clamp in two main sections hinged together.

The main objects of this invention are improvements in the above mentioned type of clamps by the provision of special structure and means for enabling the clamps to be made more economically than heretofore and at the same time providing greater strength and a more facile manner of assembling and closing the clamps. Another object is a cable clamp that insures against possible slippage of the cables or cable clamped thereby to a dangerous degree and which clamp distributes the clamping connection between the cables and clamping elements over a greater area of the cable than in the above mentioned patents, and a still further object of the invention is the inclusion of wedge like clamping elements in a cable clamp of the type disclosed in said patents, in which wedges extending longitudinally of the cable clamp against opposite sides of said cable and which wedges are provided with means movable relative thereto for also engaging the cables in a manner to prevent dangerous slippage of the wedges relative to the cable or cables clamped by such wedge or wedges, as the case may be.

Other objects and advantages will appear in the description and drawing annexed hereto.

In the drawing, Fig. 1 is a part elevational and part sectional view of my improved clamp for double cables.

Fig. 2 is an enlarged end view of the device of Fig. 1, showing the cables in section and showing, in dotted line, one of the body elements of the clamp swung to one side for insertion of the cables into the clamp.

Fig. 3 is a sectional view of Fig. 1 as seen from line 3—3 of Fig. 1.

Fig. 4 is a sectional view of Fig. 1 as seen from line 4—4 of Fig. 1.

Fig. 5 is a side elevational view of a strain clamp for a single cable that incorporates the main features of Fig. 1.

In detail, the clamps of Figs. 1 to 4 comprise a pair of elongated channels 1, 2 forming halves of the body of the clamp. When the clamp is in clamping position they are disposed with their open sides facing each other thereby combining to form a generally tubular elongated body, open at its opposite ends, which body will be generally rectangular in cross section.

The opposite sides of each channel are formed along their edges with outwardly turned flanges 3, 4 and 3', 4', as best indicated in Fig. 3, said flanges being curved so their free edges that extend longitudinally of the channels face generally toward the bottoms of the channels respectively carrying said flanges, so that the said flanges coact with the sides of the channels 1, 2 for forming relatively shallow channels at opposite sides of the main channels 1, 2 along the edges of the sides of the main channels. These shallow channels function as guides for slidably receiving the free edges and longitudinally extending margins 5, 6 of elongated channel strips, generally designated 7 (Figs. 1, 3).

The channel strips 7, of which there are a pair, one on either side of the channels 1, 2, are channels having their sides turned inwardly toward each other along their free edges to form said margins 5, 6. The free edges of the channel strips 7 are spaced apart to receive the bases of the shallow channels formed by flanges 3, 3' therebetween, and the free edges of the flanges 3, 3' are enclosed between the margins 5, 6 and the base of the channel strip 7. Thus when the channels 1, 2 are positioned together along their flanges 3, 3', the channel strips may be slipped longitudinally over flanges 3, 3' and will firmly hold the channels 1, 2 together against separation.

The flanges 3 or 3' at one or both sides of channels 1, 2 may respectively be formed at one point in the lengths thereof with a lip 8 while the other flange may be formed with a complementary recess 9 to receive such lip. Lip 8 is coplanar with the side of the channel 1 or 2, that carries the same, as indicated in Fig. 3.

In Fig. 2 it will be seen that when channel strip 7 is removed from one side of the main channels 1, 2, the said latter channels will swing apart about the connection provided by the other channel strip. In dotted line at 1', the channel 1 is shown in a position swung to one side of channel 2. When the channels 1, 2 are swung together, the lip 8 will fit in recess 9, thus preventing longitudinal movement of the main channels, relatively, under the great strain of the cables that will be placed upon them when in use.

In order to insure the retention of one of the channel strips 7 against accidentally sliding off the flanges that support the same, so as to retain the main channels hingedly connected together at one of their sides I transversely slit the flanges 4, 4' close to their opposite ends and by making the length of the channel strip such that its opposite ends terminate at said slits, it will be seen that the portions of the flanges outwardly of said slits may be easily bent outwardly to form stops 9', (Figs. 1, 2) that will retain the channel strip against sliding off the flanges at one of the sides of the clamp. The flanges at the other side of the clamp may be similarly formed at one only of their adjacent ends, while the opposite end of one of said flanges may be apertured to removably receive a cotter pin 10 (Fig. 2) that can be removed for readily sliding the channel strip 7 off said latter flanges to permit opening the clamp.

The cable clamping elements within channels 1, 2 will now be described. Rigidly secured on the base within each of the channels, is an elongated ball race 11 formed to support a row of balls 12 thereon, and having stops 13 at its ends to hold the balls against falling out. These ball races and balls may be of stainless metal and the races may be secured in place in any desired manner, such as a press fit or by welding or rivets, etc. Supported on each row of balls 12 in each of the main channels is an elongated wedge element 14. These wedge elements correspond in shape to each other, each having one of its elongated straight sides formed to ride on the balls 12, while the opposite elongated sides of each element are grooved at 15 to partially embrace and to substantially fit against one of the cables 16 that passes longitudinally through the clamp. The said grooved sides of the wedge elements are parallel, and face each other in spaced relation, which arrangement is accomplished by placing the larger end of one element in one of the channels 1, 2 adjacent the smaller end of the other element that is disposed in the other channel. Thus, upon moving the elements in opposite directions, longitudinally, within the main channels 1, 2, the adjacent grooved faces that engage the cables 16 will tighten against the cables, forcing them together at their adjacent sides, or will loosen the cables, according to whether the elements are relatively in one direction or in the other. The grooves 15 are preferably formed with flat sides extending convergently to a flat base, since this shape has been found to more tightly grip the cables than were the grooves V-shaped or hemispherical in cross section, although the V-shape is preferable to the hemispherical shape.

The flattened lateral sides of each of the elements 14 are also grooved at 17 along lines parallel with the side that rests on the balls 12, which grooves terminate short of the ends of the elements. Pins 18 carried by the sides of the main channels 1, 2 extend into these grooves and form stops against the elements sliding out of the channels or falling toward each other.

A single pin with a short groove 17 may be provided, but preferably a pair of such pins is used in a longer groove, with the pins so spaced and positioned relative to the ends of grooves 17, respectively, so as to permit adequate longitudinal movement of the elements 14 in opposite directions to clamp the cables and to enable loosening of the latter.

Heretofore, the use of wedges has been considered highly desirable were it not for the fact that the cables, under a sudden heavy load, or under an excessive load, sometimes slip relative to each other resulting in serious injury to property or life or both. To ensure against this possibility, I provide each wedge element 14 with a roller 19 having a stub axle 20 that is rotatable and rollable in slots 21 formed in the wedge elements, said slots extending parallel with the sides of the elements that ride on balls 12. Each roller 19 is disposed at the larger end of each element, and the grooved side of such element is recessed as at 22 to receive the roller before the stub shaft is fitted in the latter through the slots 21 that are formed in opposite sides of the recess. Each recess 22 is enlarged in the plane of the roller to permit the roller to move longitudinally of the slots and element carrying the same. The provision of the axle and slots is merely to prevent the rollers from accidentally dropping out of the recesses when the clamp is opened and free from the cables, or during clamping of the clamp on the cables. Otherwise the rollers could ride on the base of each recess.

The peripheral sides of rollers 19 are concave to generally correspond to the cross sectional contour of one side of a cable, and the concave surface is preferably milled to form a roughened cable gripping surface. When each element is disposed at the end of recess 22 nearest the largest end of the wedge element, the milled side of the roller very slightly projects into groove 15 in said element only about sufficient to insure a light contact with the cable, but not sufficient to materially hold the cable away from the sides and base of groove 15. Since the roller forms practically a line contact with the cable, it may very slightly press into the cable where it contacts the latter.

In operation, in placing the clamps on the cable, the clamp is first opened by removal of the channel strip 7 that is carried by the flanges, one of which is provided with the removable cotter pin 10, and the wedge elements 14 are moved longitudinally to provide the maximum spacing between their adjacent, grooved sides. In this position the larger ends of the wedge elements project substantially outwardly of the ends of the main channels 1, 2. The main channels are then swung together to full line position as shown in Fig. 2, after which the channel strip 7 that was previously removed, is slipped longitudinally on flanges 3, 3' and cotter pin 10 is inserted to prevent withdrawal of the strip. The larger ends of the wedge elements are then driven toward each other to tightly clamp the cables together between the grooved sides of the wedge elements, which movement of the wedge elements, will cause the rollers 19 to roll outwardly in recesses 22 toward the larger ends of the elements. The driving of the wedges into tight engagement with the cables also causes the rollers 19 to grip the cables, and under normal strain on the cables, the wedges will prevent slippage of the cables relatively, but should some unusual strain occur, that would ordinarily result in slippage of the cables, it will be seen that the rollers 19 will tend to be rolled toward each other, and by this action they will progressively grip the cables tighter and tighter thus preventing the cables from noticeable slippage. This action of the rollers will also tend to force the wedges into tighter relation with the cables as the friction against the roller increases.

In Fig. 5 a single cable strain clamp is shown in which only a single wedge element 14' is necessary, since the other side of the cable than the side gripped by said element is a stationary strip of metal 14" formed with a groove on its side facing the element. The only real difference between the strain clamp and the clamp shown in Fig. 1 is that one of the main channels, indicated at 23, is relatively shallow and carries the stationary strip 14" instead of carrying a wedge element, while the other channel strip is identical with either one of the channels 3, 3' of Figs. 1 to 4, in every respect, except for the provision of an extension 26 at one end for securement to a guy wire or the like through eye 27 therein. The spacing between the grooved sides of strip 14" and the wedge element 14', is, of course, less than the space between the grooved sides of elements 14 in Fig. 1, since only one cable is to be held, instead of two.

The shallow channel 23 is formed with flanges 30 and channel strips 7' secures the channel 23 and the wedge carrying channel together in exactly the same manner as already described for the double-cable clamp. Roller 19' in wedge element 14' functions, as already described for roller 19, to insure against slippage of the single cable 24 when element 14 is driven so as to grip the said cable between the strip 14" and element 14'.

Having described my invention, I claim:

1. A cable clamp comprising: an elongated shell having an open-ended passageway therethrough longitudinally thereof for a cable; cable-engaging means in said shell defining one of the sides of said passageway; means supporting said cable engaging means for movement of the latter in said shell simultaneously longitudinally of said passageway and transversely thereof toward the side of said passageway opposite said cable engaging means; a roller carried by said cable engaging means for said movement therewith and rotatable about an axis at right angles to the longitudinal axis of said passageway; means supporting said roller in a position with a point on its periphery projecting into said passageway to engage a cable to be positioned in said passageway before engagement of such cable by said cable engaging means.

2. A cable clamp of the character described including a shell having an elongated through passageway for a cable; a wedge element having two opposite divergently extending sides extending generally longitudinally of said passageway and one of which sides defines one of the sides of said passageway for engaging a cable to be positioned in said passageway; means within said shell supporting the opposite of said two sides of said element for movement of the latter simultaneously in a direction longitudinally of said passageway and transversely of said passageway toward the side of the latter opposite said element; a roller rotatably carried by said element for movement therewith and supported by said element in a position with a point on its peripheral surface projecting a relatively small distance from the said cable engaging side of said element substantially simultaneously with engagement between said latter side and such cable when said element is moved in said direction; means supporting said roller on said element for rotation of said roller on an axis at right angles to the longitudinal axis of said passageway whereby engagement between said roller and a cable in said passageway will tend to rotate said roller to carry said element in said direction when the cable is moved relative to said shell in said direction.

3. A cable clamp comprising: a pair of elongated channelled members positioned together with their open sides in confronting relation; a pair of elongated wedge-like elements each having two opposite sides extending divergently from one end longitudinally thereof whereby one of the ends of each element is thicker than the opposite end in one plane; one of said elements being in each of said members in position longitudinally of the latter with the thicker end of one element adjacent the thinner end of the other and with one of the said divergent sides of said elements in parallel, spaced, opposed relation defining opposite sides of a passageway for a pair of parallel cables adapted to extend through said passageway and to be respectively engaged by said opposite sides of the latter; means in said members supporting the other of said divergent sides of said elements substantially parallel for movement of said elements generally longitudinally thereof whereby said movement of said elements relatively with their said thinner ends leading will cause said opposed sides of said elements to progressively move toward each other for wedgedly engaging the cables to be positioned therebetween; and a roller carried by each of said elements for rotation about parallel axis substantially at right angles to the longitudinal axis of said passageway; means supporting said rollers on each element in a position with one point on the periphery of each projecting slightly outwardly of said opposed sides of said elements for engagement by one of said rollers with each of the cables to be positioned in said passageway.

JOHN T. KEMPER.